United States Patent
Marin et al.

(10) Patent No.: US 11,368,785 B2
(45) Date of Patent: Jun. 21, 2022

(54) SYSTEMS AND METHODS FOR VEHICLE SOUND ENHANCEMENT

(71) Applicant: Harman International Industries, Incorporated, Stamford, CT (US)

(72) Inventors: Jose Maria Marin, Baden-Württember (DE); David Trumpy, Novi, MI (US); Miguel Ángel Conradi Garcia-Baquero, Bavaria (DE)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/199,288

(22) Filed: Mar. 11, 2021

(65) Prior Publication Data
US 2021/0289286 A1 Sep. 16, 2021

Related U.S. Application Data

(60) Provisional application No. 62/990,358, filed on Mar. 16, 2020.

(51) Int. Cl.
*H04R 1/20* (2006.01)
*G01M 15/12* (2006.01)
*G01P 15/00* (2006.01)

(52) U.S. Cl.
CPC .............. *H04R 1/20* (2013.01); *G01M 15/12* (2013.01); *G01P 15/00* (2013.01); *H04R 2499/13* (2013.01)

(58) Field of Classification Search
CPC ..... H04R 1/20; H04R 2499/13; G01M 15/12; G01P 15/00
See application file for complete search history.

(56) References Cited

U.S. PATENT DOCUMENTS

| | | | | |
|---|---|---|---|---|
| 5,854,847 | A | * | 12/1998 | Yoshida .................. H04R 5/00 381/302 |
| 8,885,845 | B2 | * | 11/2014 | Honji ..................... G10K 15/04 381/86 |
| 2005/0094826 | A1 | | 5/2005 | Morishita |
| 2005/0201570 | A1 | | 9/2005 | Honji |

(Continued)

FOREIGN PATENT DOCUMENTS

WO 2019231452 A1 12/2019

OTHER PUBLICATIONS

European Patent Office, Extended European Search Report Issued in Application No. 21162237.8, dated Jul. 22, 2021, Germany, 12 pages.

*Primary Examiner* — Jason R Kurr
(74) *Attorney, Agent, or Firm* — McCoy Russell LLP

(57) ABSTRACT

Embodiments are disclosed for enhancing engine sound. An example method for a vehicle comprises acquiring a signal including harmonic content generated by an engine of the vehicle, upmixing the signal into a plurality of channels for a given number of engine orders, adjusting an order filter for each engine order of the given number of engine orders based on operating conditions of the engine, filtering each channel of the plurality of channels with the corresponding order filter, mixing the filtered channels into a mono output, and outputting the mono output to at least one speaker in the vehicle. The mono output is delayed based on a position of the at least one speaker such that an occupant of the vehicle perceives the mono output as originating from the engine.

18 Claims, 8 Drawing Sheets

(56) References Cited

U.S. PATENT DOCUMENTS

| | | | |
|---|---|---|---|
| 2015/0358725 A1* | 12/2015 | Hera | ........................ H04R 3/12 |
| | | | 381/102 |
| 2016/0205472 A1 | 7/2016 | Violi et al. | |
| 2017/0078822 A1* | 3/2017 | Barlow, Jr. | ............. H04S 7/307 |
| 2017/0257073 A1* | 9/2017 | Hera | ...................... G10K 15/02 |
| 2017/0374460 A1 | 12/2017 | Jung et al. | |
| 2020/0074979 A1 | 3/2020 | Kim et al. | |

* cited by examiner

SYSTEMS AND METHODS FOR VEHICLE SOUND ENHANCEMENT

CROSS-REFERENCE TO RELATED APPLICATIONS

The present application claims priority to U.S. Provisional Application No. 62/990,358, entitled "SYSTEMS AND METHODS FOR VEHICLE SOUND ENHANCEMENT", and filed on Mar. 16, 2020. The entire contents of the above-listed application are hereby incorporated by reference for all purposes.

FIELD

The disclosure relates to vehicle sound enhancement.

BACKGROUND

A vehicle may include an internal combustion engine for generating mechanical energy to drive the vehicle. The configuration of the engine, such as the arrangement of engine cylinders and valve timing for intake and exhaust valves, impacts the sound generated by the engine. For vehicles with different engine configurations, even with a same number of engine cylinders, the vehicles may sound substantially different. Some drivers may desire a certain engine sound. For example, some drivers may prefer a louder, raspier engine sound and thus may prefer to drive a sports car, while other drivers may prefer a smoother and quieter engine sound.

Various methods exist for enhancing the sound of an engine based on a desired engine sound. For example, an engine sound may be digitally synthesized based on current operating conditions, such as the revolution per minute (RPM) of the engine. However, for sporty engines with rapidly-changing RPM, such synthesis can sound artificial and unresponsive. Meanwhile, traditional acoustic sound synthesis requires a delicate tuning process to design layers of narrowband and broadband sound to be authentic.

SUMMARY

In order to enhance the engine sound while maintaining authenticity, the original engine sound may be measured and the engine harmonics may be enhanced in real-time by filtering the spurious content. A more realistic sound enhancement in the vehicle cabin may thus be obtained by using the original engine sound as a source, instead of a synthesized signal. To capture the original engine sound, a sensor such as an accelerometer is installed directly onto the engine block, which captures the harmonic content originally generated by the engine, avoiding all other sound artifacts occurring close to the engine which would be captured by a sound pressure sensor such as a microphone.

Embodiments are disclosed for enhancing engine sound. An example method for a vehicle comprises acquiring a signal including harmonic content generated by an engine of the vehicle, upmixing the signal into a plurality of channels for a given number of engine orders, adjusting an order filter for each engine order of the given number of engine orders based on operating conditions of the engine, filtering each channel of the plurality of channels with the corresponding order filter, mixing the filtered channels into a mono output, and outputting the mono output to at least one speaker in the vehicle. The mono output may be upmixed into a plurality of channels for output to a respective plurality of speakers in the vehicle, and delays may be separately applied to each channel to create a spatial effect within the cabin of the vehicle.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
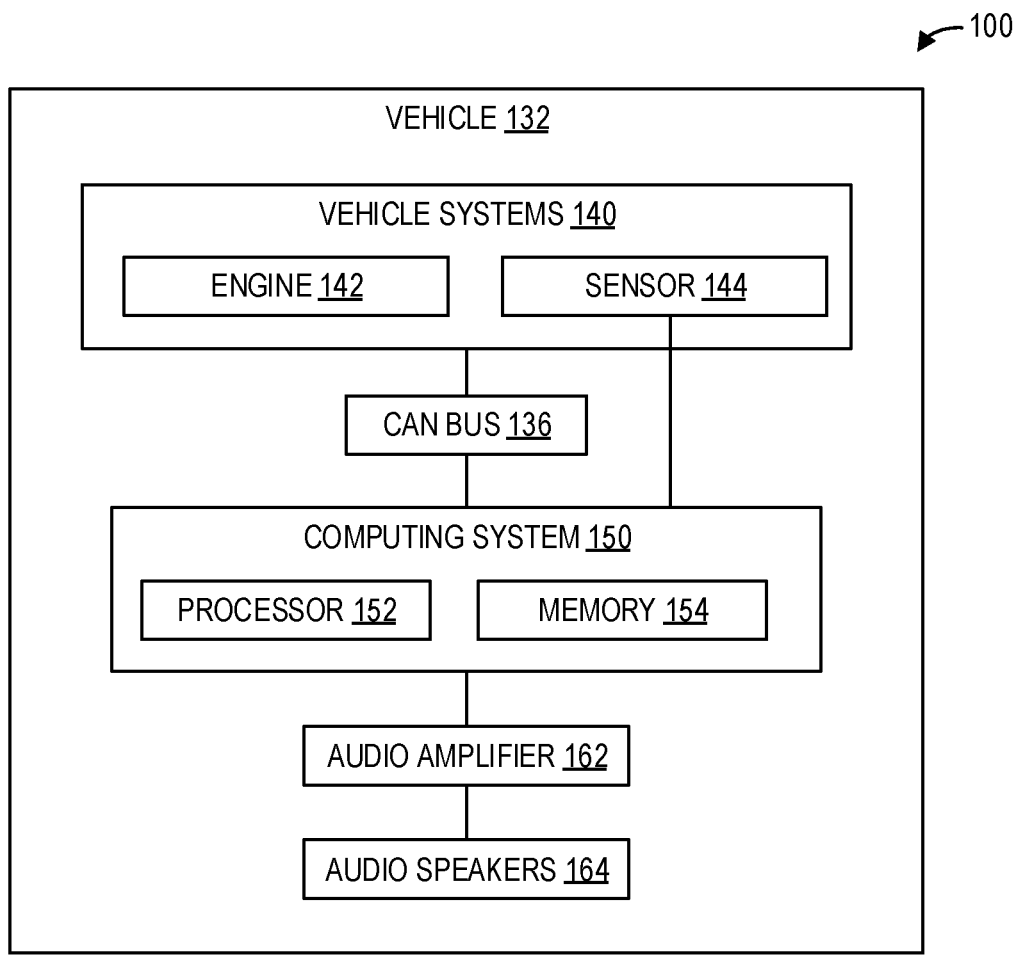
FIG. 1 is a block diagram of an example system within a vehicle for enhanced vehicle sound synthesis, in accordance with one or more embodiments of the present disclosure.

FIG. 1 is a block diagram of an example system 100 within a vehicle 132 for enhanced vehicle sound synthesis. The system 100 may be located and/or integrated within the vehicle 132. The system 100 includes one or more vehicle systems 140 such as an engine 142 of the vehicle 132. The vehicle system 140 further includes a sensor 144, such as an accelerometer, mounted to the engine 142 to measure the harmonic content generated by the engine 142. By mounting the sensor 144 directly onto the engine 142, the sensor 144 may avoid measuring or recording other sound artifacts occurring close to the engine 142, which would be captured by an airborne sound-pressure sensor, such as a microphone.

The system 100 further includes a computing system 150 comprising at least a processor 152 and a memory 154. The processor 152 may comprise one or more central processing units (CPU), a graphics processing units (GPU), digital signal processors (DSP), application specific integrated circuits (ASIC), field programmable gate arrays (FPGA), analog circuits, or combinations thereof. The memory 154 may include one or more of a main memory, a static memory, and a dynamic memory. The memory 154 may comprise a non-transitory memory device. The memory 154 may further comprise one or more volatile and/or non-volatile storage media including but not limited to random access memory, read-only memory, and the like. Executable instructions or software may be stored in the memory 154 that may be executed or processed by the processor 152.

The computing system 150 may communicate with one or more elements within the vehicle, including but not limited to vehicle systems 140 such as the engine 142 connected via an in-vehicle interconnect, such as Controller-Area-Network (CAN) bus 136. It should be understood that any suitable number and/or combination of interconnects may be used to permit communication between the computing system 150 and various in-vehicle components, including but not limited to CAN buses, Media Oriented Systems Transport (MOST) buses, Ethernet-based interconnects, and so on. Interconnects may communicate directly with in-vehicle components and/or may communicate with such components via intervening processors. In some embodiments, one or more in-vehicle components may communicate directly with the computing system 150 without or in addition to communicating with the computing system 150 via the CAN bus 136. For example, a sensor 144 mounted on the engine 142 may directly communicate measurements to the computing system 150. The sensor 144 may comprise an accelerometer configured to measure acceleration, for example by measuring vibrations of the engine 142, as described hereinabove. Further, the computing system 150 may receive measurements of various operating parameters or operating conditions of the vehicle system 140 such as engine load or torque, engine RPM, gas pedal position, and so on, as CAN messages via the CAN bus 136.

The computing system 150 is communicatively coupled to audio speakers 164 distributed throughout the vehicle 132 via an audio amplifier 162. As described further herein, the computing system 150 is configured to perform digital signal processing of the signal from the sensor 144, based on CAN messages from the CAN bus 136, in order to enhance engine sounds. The enhanced engine sounds are output, via the audio amplifier 162, to the plurality of audio speakers 164 in order to enhance the original engine sound of the engine 142 within the cabin of the vehicle 132.

Figure 2:
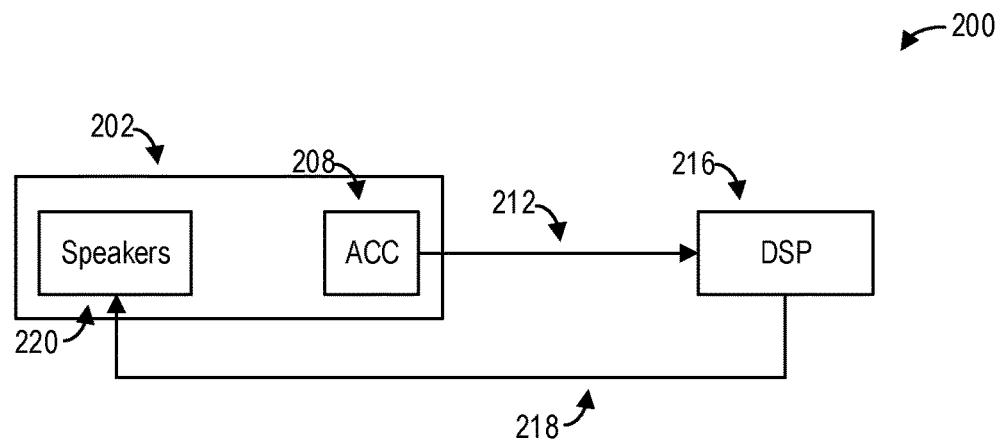
FIG. 2 is a block diagram illustrating an example method for enhanced vehicle sound synthesis, in accordance with one or more embodiments of the present disclosure.

FIG. 2 is a block diagram illustrating an example method 200 for enhanced vehicle sound synthesis. A vehicle 202 may comprise a motor vehicle, for exampling, including drive wheels and an internal combustion engine. The vehicle 202 may comprise a road automobile, among other types of vehicles. In some examples, the vehicle 202 may include a hybrid propulsion system including an energy conversion device operable to absorb energy from vehicle motion and/or the engine and convert the absorbed energy to an energy form suitable for storage by an energy storage device. The vehicle 202 may comprise the vehicle 132 described hereinabove, for example.

The internal combustion engine of the vehicle 202 may include one or more combustion chambers which may receive intake air via an intake passage and exhaust combustion gases via an exhaust passage. The internal combustion engine, or simply the engine, may comprise a four-cycle engine, wherein power is obtained via an intake cycle, a compression cycle, an explosion/expansion cycle, and an exhaust cycle. The engine may comprise a plurality of combustion chambers or cylinders, which may be arranged in series, in a V shape, or in parallel, as illustrative examples. While the four cycles are performed in the engine, a piston of the engine is raised or lowered, thereby rotating a crankshaft mechanically connected to the piston. The rotation of the crankshaft is transferred to wheels of the vehicle 202, thereby moving the vehicle 202 forward or backward. The crankshaft thus continuously rotates in accordance with repeated cycles of the engine, wherein the rate of rotations of the crankshaft or the revolutions per minute (RPM) of the crankshaft is referred to as the engine RPM. The engine RPM may vary by increasing or decreasing throughout the operation of the vehicle 202.

As shown, an accelerometer (ACC) 208 may be located or integrated into the vehicle 202, for example by mounting the accelerometer 208 onto the engine of the vehicle 202. The accelerometer 208 measures vibrations of the engine over time. The combustion cycles described hereinabove cause vibration of the engine, such that the engine vibrates with a variety of frequencies according to various factors including but not limited to engine RPM, torque, throttle position, vehicle velocity, amount of fuel injection, and so on. For example, as the engine RPM or simply RPM increases, the vibration frequency increases. As an illustrative and non-limiting example, a signal 212 acquired via the accelerometer 208 during operation of the engine of the vehicle 202 may comprise a measure of loudness (measured in decibels) as a function of frequency and RPM, wherein the intensity of vibrations in a given frequency band may be higher or lower than the intensity of vibrations in a different frequency band.

Further, engine sound is generated by the combustion within the engine as well as the vibration. While the engine generates a range of frequencies, especially under load, the root note of the engine sound is defined by a dominant frequency. As an illustrative example, for a six-cylinder engine operating at 1800 RPM, which corresponds to a frequency of 30 Hz, with a four-stroke cycle, each cylinder fires once every two crankshaft rotations. Therefore, as the number of ignition events per crankshaft revolution is three for a six-cylinder engine, the dominant frequency at 1800 RPM is 90 Hz. As the dominant frequency is three times the frequency of engine rotation, the dominant frequency is a third engine order or simply third order for a six-cylinder engine. Similarly, the dominant frequency for a two-cylinder engine is the first order, the dominant frequency for a four-cylinder engine is the second order, the dominant frequency for an eight-cylinder engine is the fourth order, the dominant frequency for a ten-cylinder engine is the fifth order, and so on.

Figure 3:
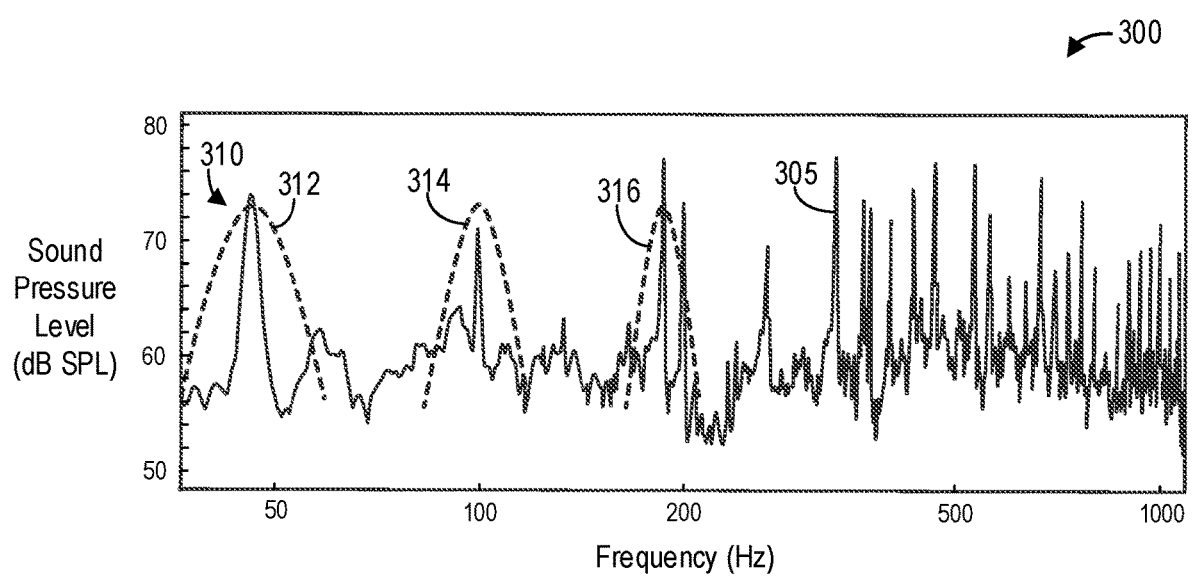
FIG. 3 is a graph illustrating a bank of bandpass filters guided by RPM for filtering sensor measurements, in accordance with one or more embodiments of the present disclosure.

In order to enhance the engine sound, the vibrations recorded by the accelerometer 208 may be filtered with a digital signal processing module 216 configured to enhance the engine sound. For example, as depicted by the graph 300 of FIG. 3, a signal 305 acquired by the accelerometer 208 (e.g., the signal 212) may be filtered with a plurality of bandpass filters 310 wherein the center frequency of the bandpass filters is guided by the RPM. In particular, each bandpass filter of the plurality of bandpass filters 310, such as the bandpass filter 312, the bandpass filter 314, and the bandpass filter 316, may be applied to a corresponding mode of the vibration signal to enhance the engine sound. Furthermore, the gain and the Q factor of the filters may be tuned based on operating conditions such as gas pedal position, engine load or engine torque, throttle position, and so on. Thus, the method 200 includes capturing the original engine sound 212, or more specifically the harmonic content originally generated by the engine, with the accelerometer 208 and enhancing the engine sound with a bandpass filter for different modes of the original engine sound 212. The enhanced engine sound 218 is then provided to one or more speakers 220 positioned within the vehicle 202 to play back the enhanced engine sound 218 to occupants of the vehicle 202. The method 200 thus creates a realistic sound enhancement in the cabin of the vehicle 202 by using the original engine sound 212 as a source, rather than a synthesized signal such as oscillators or a stored sound bank.

Figure 4:
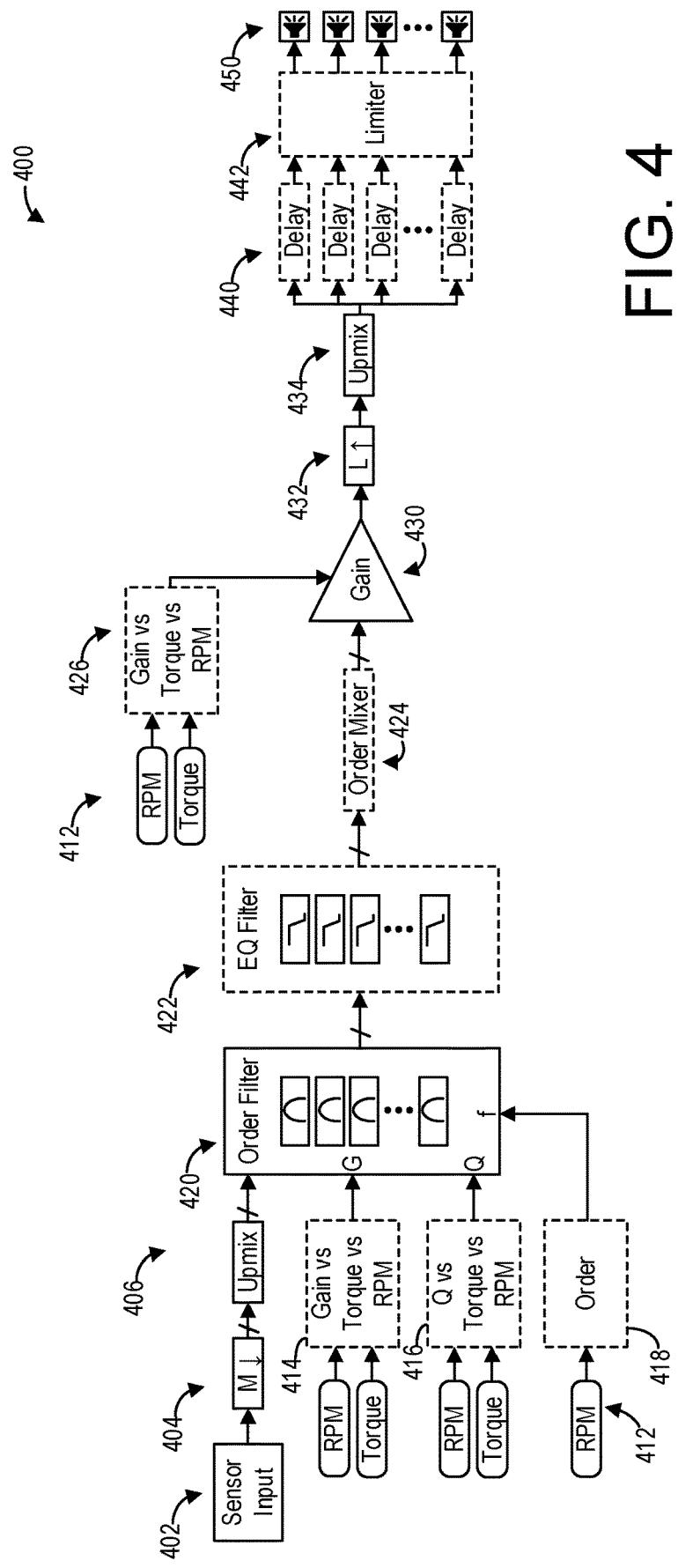
FIG. 4 is a block diagram illustrating an example digital signal processing chain for enhanced vehicle sound synthesis, in accordance with one or more embodiments of the present disclosure.

FIG. 4 is a block diagram illustrating an example digital signal processing method 400 for enhanced vehicle sound synthesis. The digital signal processing method 400 may be implemented via the computing system 150 described hereinabove, for example, as the DSP module 216.

Sensor input 402 comprises the signal from the sensor 144 or the accelerometer 208 as described hereinabove. That is, the sensor input 402 comprises measurements of the vibrations of the engine 142. As the sensor 144 may sample the engine vibrations at a high rate, the sensor input 402 is downsampled 404 to a lower sampling rate by a factor M. The downsampled signal is then upmixed 406 from a single channel to a number of channels corresponding to a number of engine orders for enhancement. In an illustrative and non-limiting example, the downsampled signal is upmixed 406 or converted from a single channel to four channels of the same downsampled data. Each channel is then input to a corresponding order filter 420. For example, as depicted, the order filters 420 may include four order filters (e.g., bandpass filters) for four different engine orders. The engine orders may correspond to whole orders, half orders (e.g., 2.5 order), and so on, depending on the particular configuration of the engine (e.g., the arrangement of the cylinders and the tuning of the various intake/exhaust valves) and thus the desired orders for enhancing. The orders are thus tuned to the firing order of the engine as described hereinabove. It should be appreciated that the method 400 may be adapted for a number of channels and a corresponding number of order filters other than four channels and four order filters. For example, the number of channels may be greater than or less than four in some examples, and so the number of engine orders and order filters may be greater than or less than four in such examples.

A plurality of CAN messages 412 or CAN signals, corresponding to measurements of RPM and torque, are also obtained via the CAN bus, as depicted, for the signal processing method 400. The CAN signals 412 are used to adjust each order filter according to the current operating conditions of the engine. For example, the gain, Q value, and center frequency (f) for each order may be determined based on the CAN signals 412 to adjust the order filters 420. In particular, the RPM and the torque are used to determine, via a three-dimensional gain lookup table 414 that returns a gain value for a pair of RPM and torque measurements, a gain value for each order filter. Further, the RPM and the torque are used to determine, via a three-dimensional Q value lookup table 416 that returns a Q value for a pair of RPM and torque measurements, a Q value for each order filter. Further, the RPM is used to determine, via an order lookup table 418, a center frequency (f) for each order based on the RPM measurement. Thus, the order filters 420 are adapted, for each order, based on the current operating conditions. The lookup tables 414, 416, and 418 are tunable to provide desired enhancement of different orders for different combinations of operating conditions.

Thus, the order filters enhance the engine harmonics by filtering out spurious content. As the engine harmonics vary their frequencies proportionally with RPM, the filters should be reactive enough to filter precisely without stability issues when a new CAN parameter arrives. Therefore, state variable filters may be used for the order filters 420. As another technique, filter coefficient morphing may be used to update the order filters as the operating conditions change. For example, to transition from an initial filter (based on a first set of operating conditions or a first set of RPM and torque measurements) to a target filter (based on a second set of operating conditions), the filter coefficients of the two filters may be blended according to a specified blend factor. Thus, the bandpass filters comprising the order filters shift in frequency, gain, and quality factor Q as a function of the RPM and torque measurements, wherein upon receiving the parameters (i.e., f, Q, and G), the filter coefficients are calculated via coefficient morphing.

Figure 5:
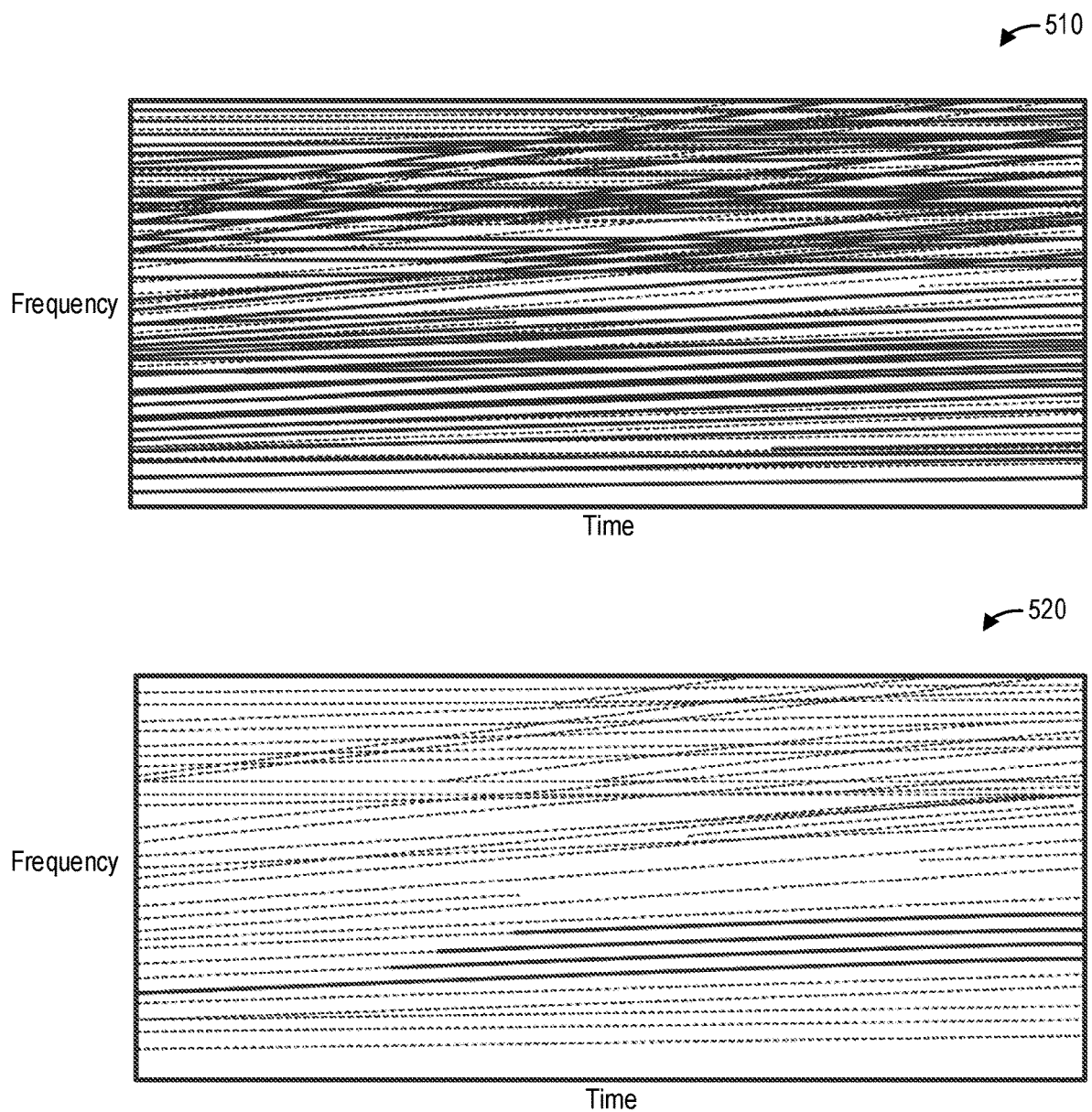
FIG. 5 shows example spectrograms before and after filtering, in accordance with one or more embodiments of the present disclosure.

As an illustrative and non-limiting example, FIG. 5 shows example spectrograms before and after filtering, including an original spectrogram 510 prior to filtering and a filtered spectrogram 520 after filtering, wherein the spectrograms 510 and 520 depict the spectrum of frequencies over time or samples. In particular, the original spectrogram 510 is obtained for a V8 engine during acceleration wherein RPM is ramping up. The spectrogram is analyzed to choose initial and target frequencies for the order filters to enhance only one harmonic (e.g., a single order), while maintaining the quality factor Q and the gain constant between the initial and target filters. The filtered spectrogram 520 depicts the signal after filtering according to the digital signal processing method 400 with coefficient morphing as mentioned hereinabove for every sample. Thus, as the frequency ramps up as depicted, the order filters may filter out a desired harmonic in real-time without audible transients or undesirable effects. The filters perform well even when changing parameters, such as RPM, rapidly.

Referring again to FIG. 4, after order filtering each channel based on the operating conditions, the filtered output is passed through corresponding equalization (EQ) filters 422 to further filter out or eliminate high-frequency content. The EQ filters 422 thus reinforce the order filters 420. The EQ filters 422 are tunable, and up to ten EQ filters for each order may be provided, depending on the application. The EQ filters 422 may comprise low-pass filters.

After EQ filtering at 420, the four filtered channels are then mixed via a tunable order mixer 424 into a single mono output. After summing the filtered signals into the mono signal, the gain of the mono signal is adjusted. For example, based on the RPM and torque measurements of the CAN signals 412, a main gain is obtained from a three-dimensional main gain lookup table 426, and the gain of the mono signal is adjusted according to the main gain. The gain-adjusted signal is then upsampled 432 to the original sampling rate of the sensor input 402, for example by a factor L, and then upmixed 434 to a plurality of channels as depicted. For example, the signal may be upmixed 434 to four channels, with one channel for each speaker of the plurality of speakers 450 that will output the enhanced engine sound, though it should be appreciated that the method 400 may be adapted for a number of channels and respective speakers greater than four or less than four.

Delays 440 are applied to each channel based on the relative distribution of the speakers 450 throughout the cabin of the vehicle, such that enhanced engine sound is perceived as coming from the engine. For example, if the engine is positioned in the front of the vehicle, the signals may be delayed such that an occupant of the vehicle perceives the enhanced engine sound as coming from the front of the vehicle. Similarly, if the engine is positioned in the rear of the vehicle, the signals may be delayed such that the occupant perceives the enhanced engine sound as coming from the rear of the vehicle.

In addition, a limiter 442 may be applied to the signals, such that if one of the channel levels needs to be decreased, the other channels may be adjusted as well, thereby balancing the signals. After passing the signals through the limiter 442, the signals are output to respective speakers 450 of the vehicle. The signals may be added to the normal audio content (e.g., radio or other musical playback, other audio playback such as navigation prompts, warning chimes, and so on) already being output to the speakers 450. By delaying and limiting the signals as described hereinabove prior to mixing the signals into the pre-existing audio output of the speakers 450, the enhanced engine sound comprising the signals may create the spatial image regardless of audio balancing for the audio system including the speakers 450. For example, audio such as music may be played back through the speakers 450 with balanced levels and a stereo audio distribution, while the enhanced engine sound signals superimposed onto the musical audio is perceived with the spatial image or spatial effect such that the engine sound generated by the engine is enhanced with the enhanced engine sound.

As indicated by the legend, the delays 440 and the limiter 442 may also be tunable according to the desired application or configuration of the vehicle (e.g., the configuration of the engine, the configuration and number of the speakers, and so on). It should be appreciated that some parameters, such as the EQ filters 422, the order mixer 424, the delay 440, and the limiter 442 may be tuned once based on the desired application or configuration of the vehicle, and do not change in real time. Other parameters change in real-time when a new CAN message arrives, for example, to change the harmonics filters. While the CAN protocol normally works at a rate of 10 ms or 50 ms, in order to avoid de-synchronization between the actual engine sound and the output of the signal processing, the CAN protocol preferably operates at 10 ms. The parameters that may be tuned in real-time are thus the order frequency, the 3D gain table, the 3D quality factor table, and the 3D main gain table.

Figure 6:
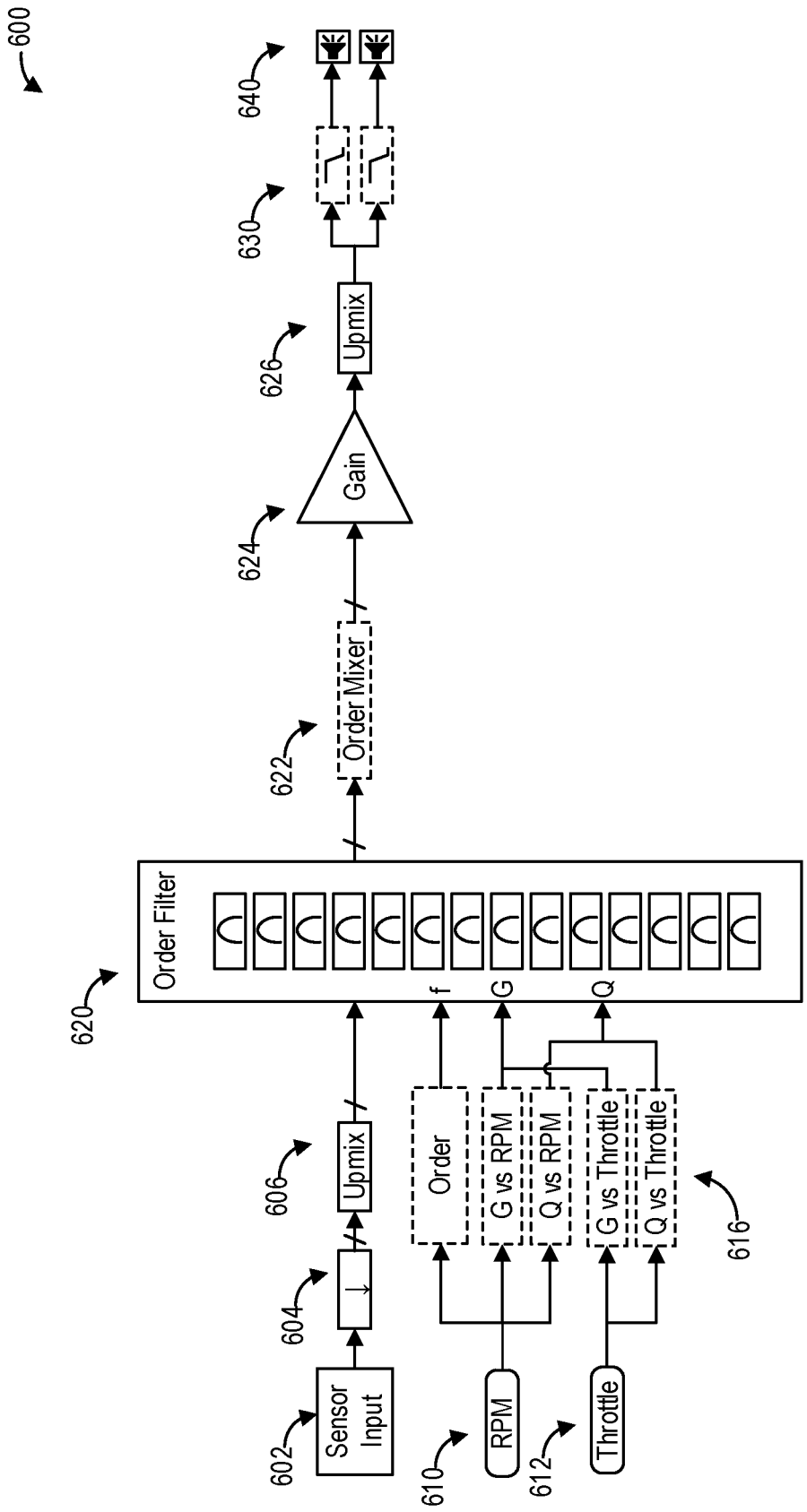
FIG. 6 is a block diagram illustrating another example digital signal processing chain for enhanced vehicle sound synthesis, in accordance with one or more embodiments of the present disclosure.

As another illustrative and non-limiting example, FIG. 6 is a block diagram illustrating another example digital signal processing chain 600 for enhanced vehicle sound synthesis. A sensor input 602, such as the signal from a sensor such as an accelerometer, is downsampled 604, and then upmixed 606 to a desired number of channels. In the depicted example, the signal is upmixed to fourteen channels for fourteen orders. Selectively filtering such a number of filters for such a number of orders enables a more fine-tuned control over the enhancement of the engine sound. To that end, CAN signals such as the RPM measurement 610 and the throttle position 612 may be used to adjust the order filters 620 for each order based on a plurality of lookup tables 616. For example, as depicted, the RPM 610 may be used to determine a center frequency (f) for each order. Further, the RPM 610 and the throttle position 612 may be used to determine a gain (G) for each order and a quality factor (Q) for each order. The lookup tables 616 may be tuned according to the desired enhancement of engine orders based on the RPM and the throttle position. Each order filter 620 is therefore adjusted to target a specific order. After order filtering at 620, the fourteen filtered signals may be mixed or summed via the order mixer 622 into a mono output. The gain of the mono output is adjusted as desired at 624, and then upmixed 626 into a desired number of channels. The signal for each channel is then filtered, for example with a tunable biquad filter 630, prior to outputting the signals to speakers 640.

Figure 7A:
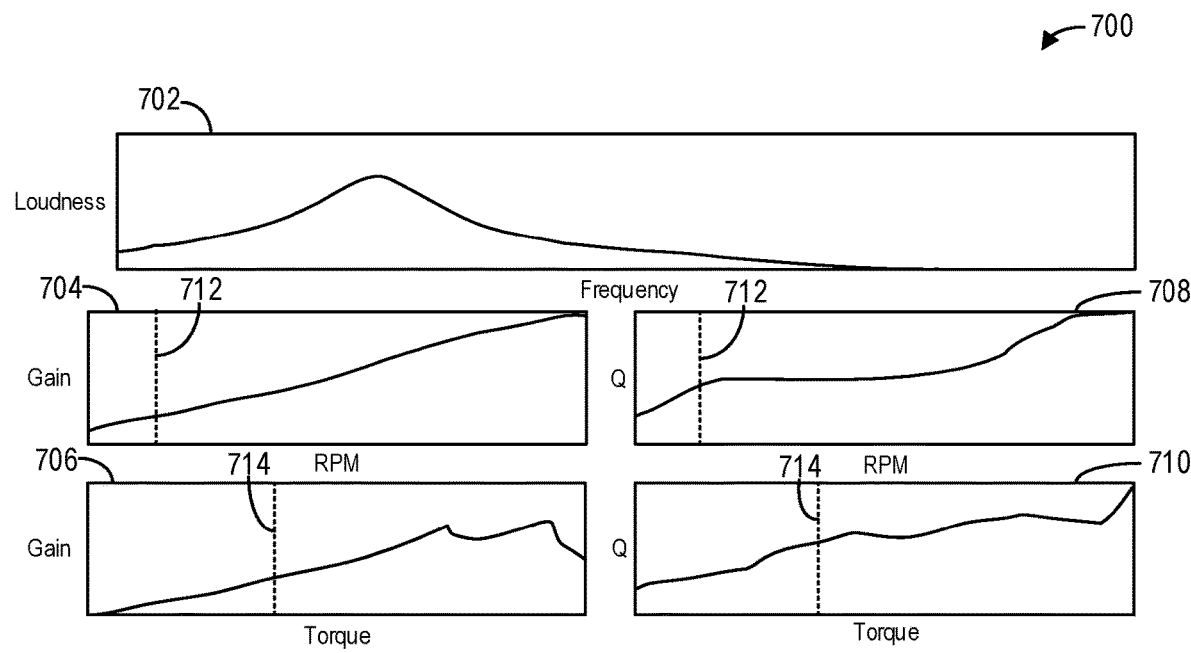
FIG. 7A shows a set of graphs illustrating example lookup tables for determining an example first order filter for a first order, in accordance with one or more embodiments of the present disclosure.

To illustrate how the order filters may be adjusted for each order, FIGS. 7A-7D depict different order filters for four different orders. In particular, FIG. 7A shows a set of graphs 700 illustrating example lookup tables for determining an example first order filter for a first order. The set of graphs 700 include a graph 702 illustrating a first order filter for the first order. An example three-dimensional gain lookup table that outputs a gain for a given RPM and torque measurement is depicted as two two-dimensional lookup tables, namely the gain-RPM lookup table 704 and the gain-torque lookup table 706. Similarly, an example three-dimensional quality factor lookup table that outputs a quality factor Q for a given pair of RPM and torque measurements is depicted as two two-dimensional lookup tables, namely the Q-RPM lookup table 708 and the Q-torque lookup table 710. The gain and Q factors for the first order filter depicted in graph 702 are thus determined based on the RPM measurement 712 and the torque measurement 714. Further, the center frequency of the first order filter depicted in the graph 702 is determined based on the RPM measurement 712.

Figure 7B:
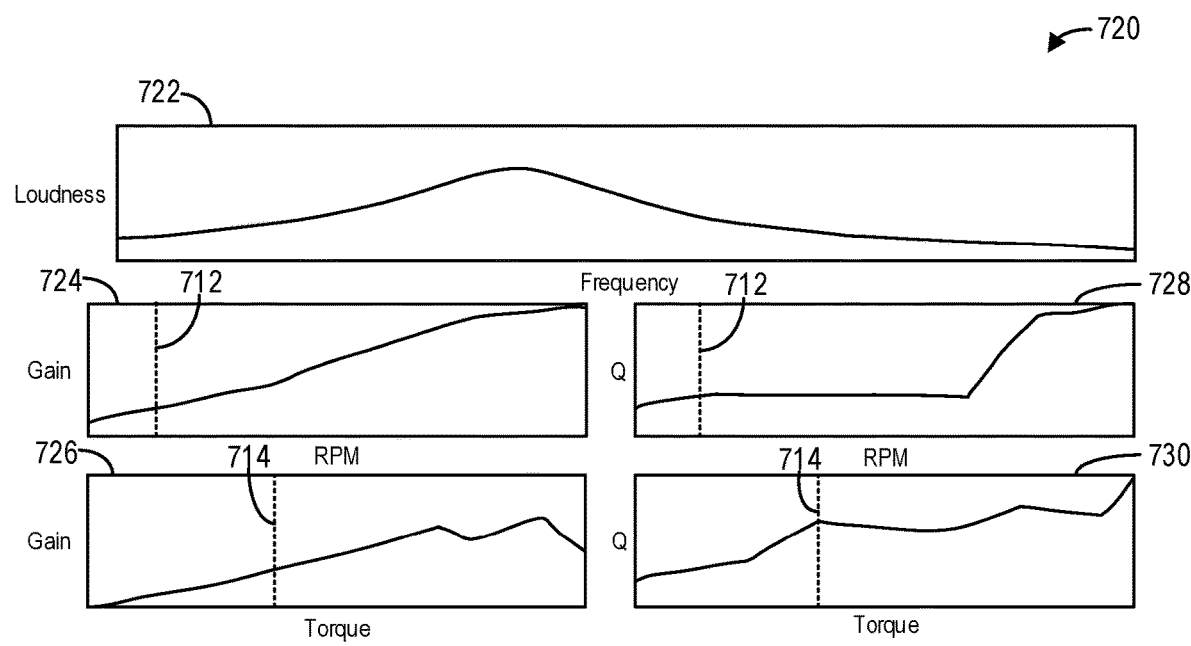
FIG. 7B shows a set of graphs illustrating example lookup tables for determining an example second order filter for a second order, in accordance with one or more embodiments of the present disclosure.

Similarly, FIG. 7B shows a set of graphs 720 illustrating example lookup tables for determining an example second order filter for a second order. The set of graphs 720 include a graph 722 illustrating a second order filter for the second order, as well as a gain-RPM lookup table 724, a gain-torque lookup table 726, a Q-RPM lookup table 728, and a Q-torque lookup table 730 for the second order. The gain and Q factors for the second order filter depicted in graph 722 are thus determined based on the RPM measurement 712 and the torque measurement 714. Further, the center frequency of the second order filter depicted in the graph 722 is determined based on the RPM measurement 712.

Figure 7C:
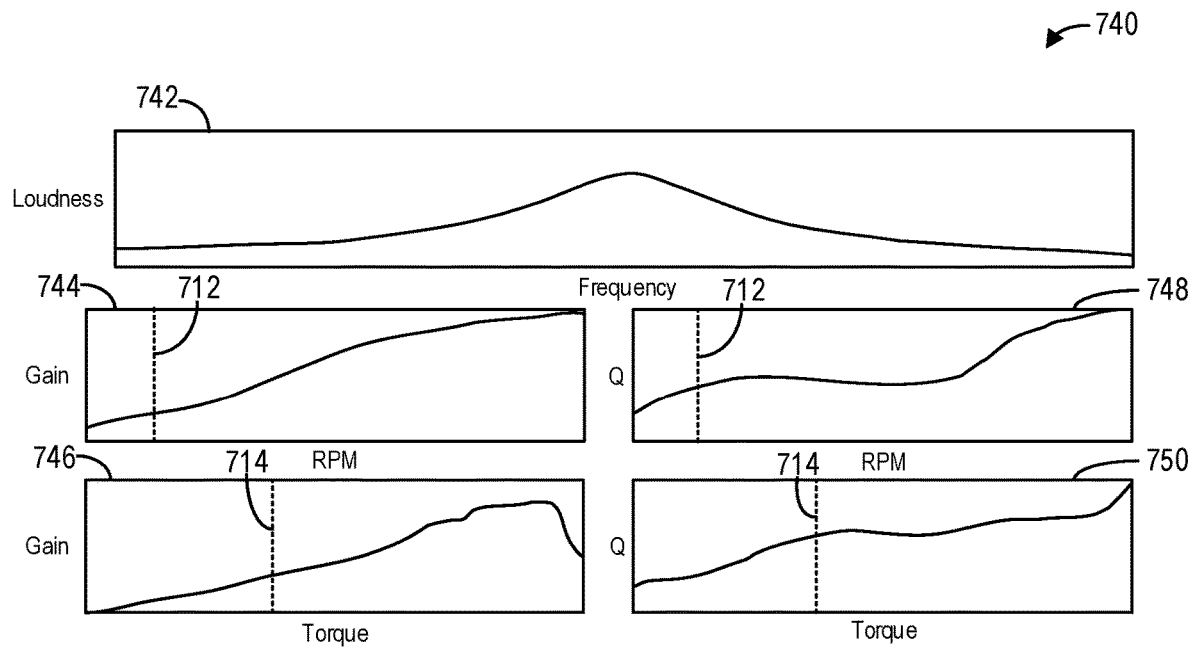
FIG. 7C shows a set of graphs illustrating example lookup tables for determining an example third order filter for a third order, in accordance with one or more embodiments of the present disclosure.

FIG. 7C shows a set of graphs 740 illustrating example lookup tables for determining an example third order filter for a third order. The set of graphs 740 include a graph 742 illustrating a third order filter for the third order, as well as a gain-RPM lookup table 744, a gain-torque lookup table 746, a Q-RPM lookup table 748, and a Q-torque lookup table 750 for the third order. The gain and Q factors for the third order filter depicted in graph 742 are thus determined based on the RPM measurement 712 and the torque measurement 714. Further, the center frequency of the third order filter depicted in the graph 742 is determined based on the RPM measurement 712.

Figure 7D:
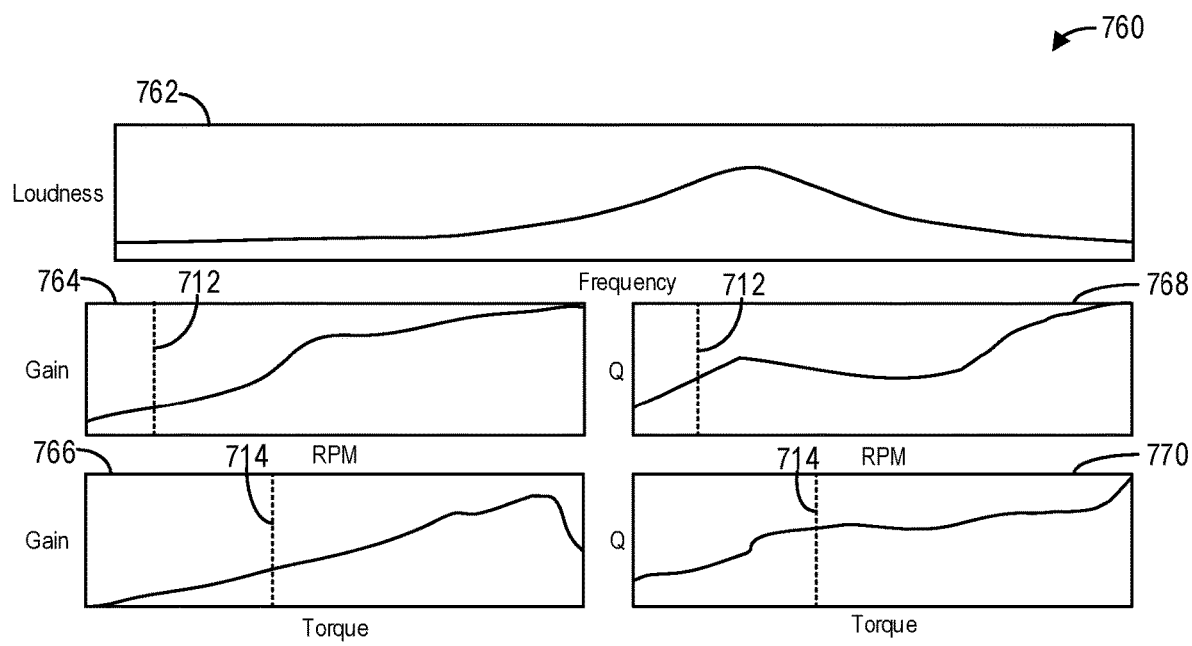
FIG. 7D shows a set of graphs illustrating example lookup tables for determining an example fourth order filter for a fourth order, in accordance with one or more embodiments of the present disclosure.

FIG. 7D shows a set of graphs 760 illustrating example lookup tables for determining an example fourth order filter for a fourth order. In particular, the set of graphs 760 include a graph 762 illustrating a fourth order filter for the fourth order, as well as a gain-RPM lookup table 764, a gain-torque lookup table 766, a Q-RPM lookup table 768, and a Q-torque lookup table 770 for the fourth order. The gain and Q factors for the fourth order filter depicted in graph 762 are thus determined based on the RPM measurement 712 and the torque measurement 714. Further, the center frequency of the fourth order filter depicted in the graph 762 is determined based on the RPM measurement 712.

Figure 8:
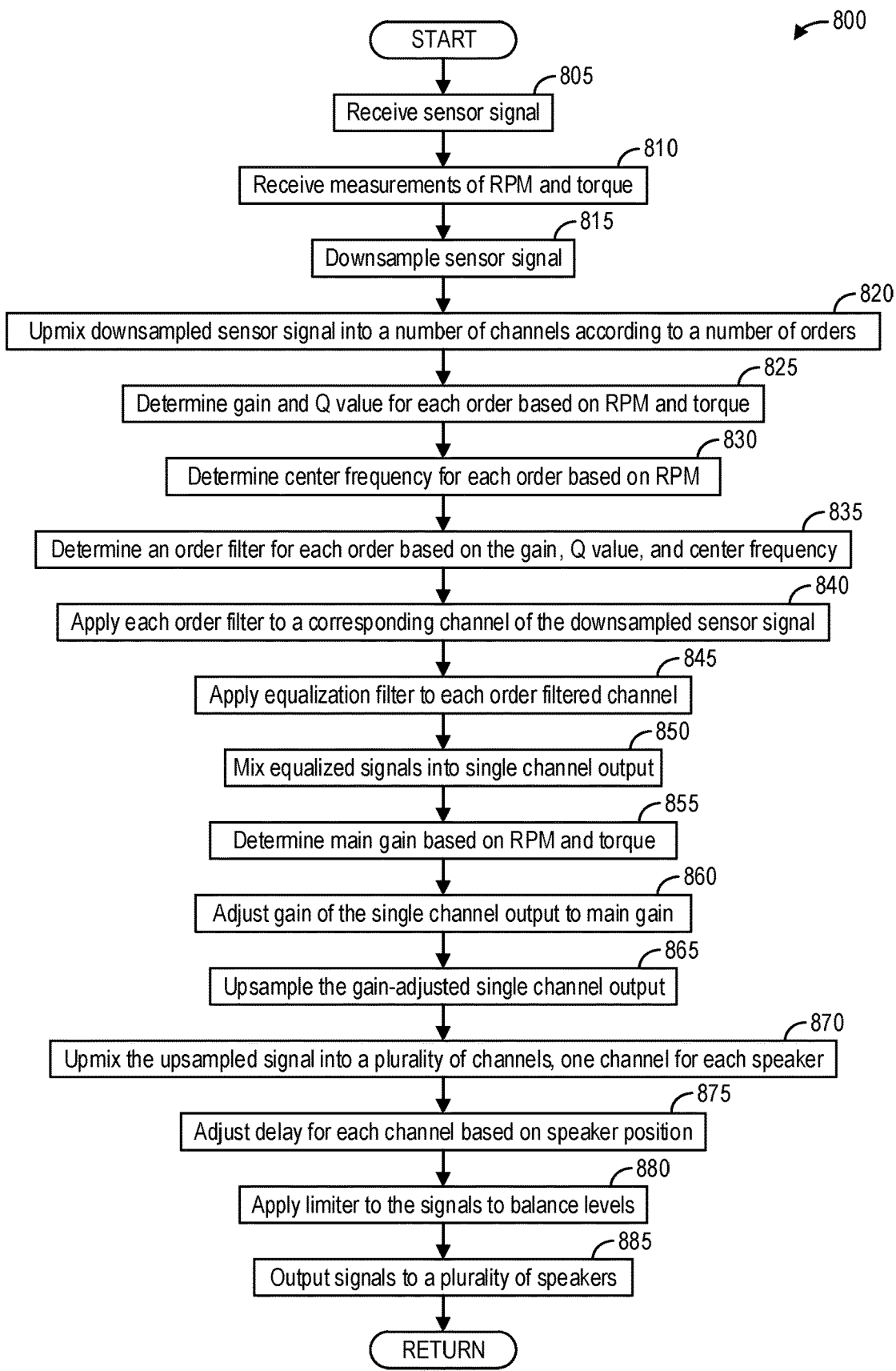
FIG. 8 shows a high-level flow chart illustrating an example method for enhanced vehicle sound synthesis, in accordance with one or more embodiments of the present disclosure.

FIG. 8 shows a high-level flow chart illustrating an example method 800 for enhanced vehicle sound synthesis. The method 800 may be implemented, for example, as the digital signal processing method 400 in the computing system 150, as a non-limiting example.

Method 800 begins at 805. At 805, method 800 receives a sensor signal, such as the sensor input 402 from the sensor 144. Further, at 810, method 800 receives measurements of RPM and torque, for example via the CAN bus 136. At 815, method 800 downsamples the sensor signal. At 820, method 800 upmixes the downsampled sensor signal into a number of channels according to a number of orders. At 825, method 800 determines a gain value and a Q value for each order based on the RPM and torque, for example by retrieving the gain values and Q values from the lookup tables 414 and 416. Further, at 830, method 800 determines a center frequency for each order based on the RPM, for example by retrieving center frequencies for each order from the order lookup table 418.

At 835, method 800 determines an order filter for each order based on the gain, Q value, and center frequency. Each order filter may be different, as described hereinabove with regard to FIGS. 7A-7D. Further, the filter coefficients may also be determined according to filter coefficient morphing in order to maintain stability and prevent transient frequencies from passing through. At 840, method 800 applies each order filter to a corresponding channel of the downsampled sensor signal. Further, at 845, method 800 applies an equalization filter to each order filtered channel to filter out high-frequency content. After filtering each channel, method 800 continues to 850. At 850, method 800 mixes the equalized signals into a single channel output. At 855, method 800 determines a main gain based on the RPM and torque. At 860, method 800 adjusts the gain of the single channel output based on the main gain. At 865, method 800 upsamples the gain-adjusted single channel output. At 870, method 500 upmixes the upsampled signal into a plurality of channels, including one channel for each speaker. At 875, method 800 adjusts a delay for each channel based on speaker position. At 880, method 800 applies a limiter to the signals to balance the levels. At 885, method 800 outputs the signals to a plurality of speakers. Method 800 then returns.

Thus, in one embodiment, a method for a vehicle comprises acquiring, from a sensor configured to measure engine sounds of an engine of the vehicle, the measured engine sounds, filtering the measured engine sound based on operating conditions of the engine to obtain an enhanced engine sound, and outputting, to a speaker positioned in a cabin of the vehicle, the enhanced engine sound.

In a first example of the method, filtering the measured engine sound based on the operating conditions of the engine to obtain the enhanced engine sound comprises upmixing the measured engine sound into a plurality of channels for a given number of engine orders, adjusting an order filter for each engine order of the given number of engine orders based on the operating conditions of the engine, filtering each channel of the plurality of channels with the corresponding order filter, and mixing the filtered channels into a mono output comprising the enhanced engine sound. In a second example of the method optionally including the first example, adjusting the order filter for each engine order based on the operating conditions of the engine comprises adjusting a gain and a quality factor for each order filter based on measurements of revolutions per minute (RPM) and torque of the engine, and adjusting a center frequency for each order filter based on the RPM. In a third example of the method optionally including one or more of the first and second examples, the method further comprises filtering each channel with a low-pass filter prior to mixing the filtered channels into the mono output. In a fourth example of the method optionally including one or more of the first through third examples, the method further comprises upmixing the mono output into a second plurality of channels, and applying a separate delay to each channel of the second plurality of channels, wherein outputting the enhanced engine sound to the speaker comprises outputting the delayed channels to respective speakers in the vehicle.

In another embodiment, a method for a vehicle comprises acquiring a signal including harmonic content generated by an engine of the vehicle, upmixing the signal into a plurality of channels for a given number of engine orders, adjusting an order filter for each engine order of the given number of engine orders based on operating conditions of the engine, filtering each channel of the plurality of channels with the corresponding order filter, mixing the filtered channels into a mono output, and outputting the mono output to at least one speaker in the vehicle.

In a first example of the method, acquiring the signal comprises acquiring the signal via an accelerometer mounted to the engine. In a second example of the method optionally including the first example, adjusting the order filter for each engine order based on the operating conditions of the engine comprises adjusting a gain and a quality factor for each order filter based on measurements of revolutions per minute (RPM) and torque of the engine, and further adjusting a center frequency for each order filter based on the RPM. In a third example of the method optionally including one or more of the first and second examples, the method further comprises filtering each channel with a low-pass filter prior to mixing the filtered channels into the mono output. In a fourth example of the method optionally including one or more of the first through third examples, the method further comprises adjusting a main gain of the mono output based on measurements of RPM and torque of the engine. In a fifth example of the method optionally including one or more of the first through fourth examples, the method further comprises upmixing the mono output into a second plurality of channels, and applying a separate delay to each channel of the second plurality of channels, wherein outputting the mono output to at least one speaker in the vehicle comprises outputting the delayed channels to respective speakers in the vehicle. In a sixth example of the method optionally including one or more of the first through fifth examples, the method further comprises running the delayed channels through a limiter to balance levels prior to outputting the delayed channels to the respective speakers in the vehicle. In a seventh example of the method optionally including one or more of the first through sixth examples, the mono output is output to the at least one speaker in the vehicle within 10 milliseconds of acquiring the signal.

In yet another embodiment, a system for a vehicle comprises a sensor configured to measure engine sounds of an engine of the vehicle, a speaker positioned in a cabin of the vehicle, and a computing system configured to: acquire, from the sensor, the measured engine sounds; apply filters to the measured engine sound based on operating conditions of the engine to obtain an enhanced engine sound; and output, to the speaker, the enhanced engine sound.

In a first example of the system, the sensor comprises an accelerometer, and wherein the measured engine sound comprises vibrations generated by the engine. In a second example of the system optionally including the first example, to apply the filters to the measured engine sound based on the operating conditions of the engine to obtain the enhanced engine sound, the computing system is further configured to: upmix the measured engine sound into a plurality of channels for a given number of engine orders; adjust an order filter for each engine order of the given number of engine orders based on the operating conditions of the engine; filter each channel of the plurality of channels with the corresponding order filter; and mix the filtered channels into a mono output comprising the enhanced engine sound. In a third example of the system optionally including one or more of the first and second examples, to adjust the order filter for each engine order based on the operating conditions of the engine, the computing system is further configured to: adjust a gain and a quality factor for each order filter based on measurements of revolutions per minute (RPM) and torque of the engine, and adjust a center frequency for each order filter based on the RPM. In a fourth example of the system optionally including one or more of the first through third examples, the computing system is further configured to: filter each channel with a low-pass filter prior to mixing the filtered channels into the mono output. In a fifth example of the system optionally including one or more of the first through fourth examples, the system further comprises a plurality of speakers including the speaker, wherein the computing system is further configured to: upmix the mono output into a second plurality of channels; and apply a separate delay to each channel of the second plurality of channels, wherein outputting the enhanced engine sound to the speaker comprises outputting the delayed channels to respective speakers in the vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems described above with respect to FIGS. 1 and 2. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method for a vehicle, comprising:
    acquiring, from a sensor configured to measure engine sounds of an engine of the vehicle, the measured engine sounds;
    filtering the measured engine sound based on operating conditions of the engine to obtain an enhanced engine sound, including:
        upmixing the measured engine sound into a plurality of channels for a given number of engine orders,
        adjusting an order filter for each engine order of the given number of engine orders based on the operating conditions of the engine,
        filtering each channel of the plurality of channels with the corresponding order filter and with a low-pass filter, and
        mixing the filtered channels into a mono output comprising the enhanced engine sound; and
    outputting, to a speaker positioned in a cabin of the vehicle, the enhanced engine sound.

2. The method of claim 1, wherein adjusting the order filter for each engine order based on the operating conditions of the engine comprises:
    adjusting a gain and a quality factor for each order filter based on measurements of revolutions per minute (RPM) and torque of the engine; and
    adjusting a center frequency for each order filter based on the RPM.

3. The method of claim 1, further comprising:
    upmixing the mono output into a second plurality of channels; and
    applying a separate delay to each channel of the second plurality of channels, wherein outputting the enhanced engine sound to the speaker comprises outputting the delayed channels to respective speakers in the vehicle.

4. A method for a vehicle, comprising:
    acquiring a signal including harmonic content generated by an engine of the vehicle;
    upmixing the signal into a plurality of channels for a given number of engine orders;
    adjusting an order filter for each engine order of the given number of engine orders based on operating conditions of the engine;
    filtering each channel of the plurality of channels with the corresponding order filter;
    mixing the filtered channels into a mono output; and
    outputting the mono output to at least one speaker in the vehicle,
    wherein the order filter for each engine order corresponds with a multiple of a number of ignition events per revolution of a crankshaft of the engine of the vehicle.

5. The method of claim 4, wherein acquiring the signal comprises acquiring the signal via an accelerometer mounted to the engine.

6. The method of claim 4, wherein adjusting the order filter for each engine order based on the operating conditions of the engine comprises adjusting a gain and a quality factor for each order filter based on measurements of revolutions per minute (RPM) and torque of the engine, and further adjusting a center frequency for each order filter based on the RPM.

7. The method of claim 4, further comprising filtering each channel with a low-pass filter prior to mixing the filtered channels into the mono output.

8. The method of claim 4, further comprising adjusting a main gain of the mono output based on measurements of RPM and torque of the engine.

9. The method of claim 4, further comprising upmixing the mono output into a second plurality of channels, and applying a separate delay to each channel of the second plurality of channels, wherein outputting the mono output to at least one speaker in the vehicle comprises outputting the delayed channels to respective speakers in the vehicle.

10. The method of claim 9, further comprising running the delayed channels through a limiter to balance levels prior to outputting the delayed channels to the respective speakers in the vehicle.

11. The method of claim 4, wherein the mono output is output to the at least one speaker in the vehicle within 10 milliseconds of acquiring the signal.

12. The method of claim 4, further comprising mixing the mono signal into normal audio output to the at least one speaker.

13. A system for a vehicle, comprising:
a sensor configured to measure engine sounds of an engine of the vehicle;
a speaker positioned in a cabin of the vehicle; and
a computing system configured to:
   acquire, from the sensor, the measured engine sounds;
   apply filters to the measured engine sound based on operating conditions of the engine to obtain an enhanced engine sound, including to:
      upmix the measured engine sound into a plurality of channels for a given number of engine orders, and
      adjust an order filter for each engine order of the given number of engine orders based on the operating conditions of the engine,
      wherein the order filter for each engine order corresponds with a multiple of a number of ignition events per revolution of a crankshaft of the engine of the vehicle; and
   output, to the speaker, the enhanced engine sound.

14. The system of claim 13, wherein the sensor comprises an accelerometer, and wherein the measured engine sound comprises vibrations generated by the engine.

15. The system of claim 13, wherein, to apply the filters to the measured engine sound based on the operating conditions of the engine to obtain the enhanced engine sound, the computing system is further configured to:
filter each channel of the plurality of channels with the corresponding order filter; and
mix the filtered channels into a mono output comprising the enhanced engine sound.

16. The system of claim 15, wherein, to adjust the order filter for each engine order based on the operating conditions of the engine, the computing system is further configured to:
adjust a gain and a quality factor for each order filter based on measurements of revolutions per minute (RPM) and torque of the engine; and
adjust a center frequency for each order filter based on the RPM.

17. The system of claim 15, wherein the computing system is further configured to:
filter each channel with a low-pass filter prior to mixing the filtered channels into the mono output.

18. The system of claim 15, further comprising a plurality of speakers including the speaker, wherein the computing system is further configured to:
upmix the mono output into a second plurality of channels; and
apply a separate delay to each channel of the second plurality of channels, wherein outputting the enhanced engine sound to the speaker comprises outputting the delayed channels to respective speakers in the vehicle.

* * * * *